(12) United States Patent
Radelet et al.

(10) Patent No.: US 11,527,835 B2
(45) Date of Patent: Dec. 13, 2022

(54) METHODS OF PREPARING A COMPOSITE DIELECTRIC MATERIAL

(71) Applicant: CommScope Technologies LLC, Hickory, NC (US)

(72) Inventors: Christiaan Radelet, Aarschot (BE); Hans Bols, Geel (BE)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/641,091

(22) PCT Filed: Jul. 27, 2018

(86) PCT No.: PCT/US2018/044002
§ 371 (c)(1),
(2) Date: Feb. 21, 2020

(87) PCT Pub. No.: WO2019/055134
PCT Pub. Date: Mar. 21, 2019

(65) Prior Publication Data
US 2020/0259264 A1 Aug. 13, 2020

Related U.S. Application Data (60) Provisional application No. 62/559,014, filed on Sep. 15, 2017.

(51) Int. Cl.
*H01Q 15/08* (2006.01)
*H01Q 1/24* (2006.01)
(Continued)

(52) U.S. Cl.
CPC ....... *H01Q 15/08* (2013.01); *B29D 11/00817* (2013.01); *H01Q 1/241* (2013.01); *H01Q 19/02* (2013.01); *H04W 84/042* (2013.01)

(58) Field of Classification Search
CPC .. B29D 11/00817; H01Q 15/08; H01Q 1/241; H01Q 19/02
See application file for complete search history.

(56) References Cited

U.S. PATENT DOCUMENTS

| 2,883,347 A | 4/1959 | Fischer et al. |
| 3,083,124 A | 3/1963 | Rahmes |

(Continued)

FOREIGN PATENT DOCUMENTS

| EP | 0309982 A2 | 4/1982 |
| EP | 1730811 B1 | 1/2012 |

(Continued)

OTHER PUBLICATIONS

International Search Report and Written Opinion of the International Searching Authority, International Application No. PCT/US2018/044002, dated Nov. 7, 2018, 14 pp.

*Primary Examiner* — Mathieu D Vargot
(74) *Attorney, Agent, or Firm* — Myers Bigel, P.A.

(57) ABSTRACT

Methods of preparing composite dielectric materials used in lenses for communications antennas. The methods can include one or more of: using induction heating to expand expandable dielectric particles; combining expandable dielectric particles with pre-expanded dielectric material prior to expansion; and/or performing the expansion of the expandable dielectric particles within a lens or other container.

16 Claims, 7 Drawing Sheets

(51) Int. Cl.
  *H01Q 19/02*  (2006.01)
  *B29D 11/00*  (2006.01)
  *H04W 84/04*  (2009.01)

(56) References Cited

U.S. PATENT DOCUMENTS

| | | | |
|---|---|---|---|
| 3,243,483 A | | 3/1966 | Marshall |
| 3,254,345 A | | 5/1966 | Hannan |
| 3,359,560 A | * | 12/1967 | Horst .................... H01Q 15/08 |
| | | | 343/911 R |
| 3,917,773 A | | 11/1975 | Gates et al. |
| 4,288,337 A | | 9/1981 | Ota et al. |
| 4,353,998 A | | 10/1982 | Gagliani et al. |
| 4,482,513 A | | 11/1984 | Auletti |
| 4,588,443 A | | 5/1986 | Bache |
| 4,613,784 A | | 9/1986 | Haun et al. |
| 4,781,876 A | | 11/1988 | Kia |
| 4,973,965 A | | 11/1990 | Ridge et al. |
| 4,980,233 A | | 12/1990 | McCullough et al. |
| 5,041,472 A | | 8/1991 | Myer |
| 5,047,776 A | | 9/1991 | Baller |
| 5,154,973 A | | 10/1992 | Imagawa et al. |
| 5,356,958 A | | 10/1994 | Matthews |
| 5,476,612 A | | 12/1995 | Wessling et al. |
| 5,498,644 A | | 3/1996 | Reo |
| 5,665,787 A | | 9/1997 | Nowak et al. |
| 5,677,045 A | | 10/1997 | Nagai et al. |
| 5,677,796 A | | 10/1997 | Zimmerman et al. |
| 5,785,913 A | | 7/1998 | Clark et al. |
| 5,869,173 A | | 2/1999 | Zheng et al. |
| 5,879,794 A | | 3/1999 | Korleski |
| 5,904,978 A | | 5/1999 | Hanrahan et al. |
| 5,958,794 A | | 9/1999 | Bruxvoort et al. |
| 6,036,893 A | | 3/2000 | Lier et al. |
| 6,166,109 A | | 12/2000 | Spitler et al. |
| 6,171,688 B1 | | 1/2001 | Zheng et al. |
| 6,195,058 B1 | | 2/2001 | Nakamura et al. |
| 6,241,914 B1 | | 6/2001 | Schleifstein |
| 6,266,029 B1 | | 7/2001 | Lee et al. |
| 6,358,532 B2 | | 3/2002 | Starling et al. |
| 6,365,973 B1 | | 4/2002 | Koning |
| 6,424,319 B2 | | 7/2002 | Ebling et al. |
| 6,433,936 B1 | | 8/2002 | Carpenter et al. |
| 6,489,928 B2 | | 12/2002 | Sakurada |
| 6,562,448 B1 | | 5/2003 | Chamberlain et al. |
| 6,660,193 B2 | | 12/2003 | Myhre |
| 6,781,487 B2 | | 8/2004 | Hattori et al. |
| 6,855,426 B2 | | 2/2005 | Yadav |
| 7,037,865 B1 | | 5/2006 | Kimberly |
| 7,068,898 B2 | | 6/2006 | Buretea et al. |
| 7,113,146 B2 | | 9/2006 | Pearlman et al. |
| 7,235,502 B2 | | 6/2007 | Kalpat et al. |
| 7,268,637 B2 | | 9/2007 | Aisenbrey |
| 7,317,420 B2 | | 1/2008 | Aisenbrey |
| 7,365,395 B2 | | 4/2008 | Stumbo et al. |
| 7,592,957 B2 | | 9/2009 | Achour et al. |
| 8,089,152 B2 | | 1/2012 | Miller |
| 8,271,241 B2 | | 9/2012 | Akyurtlu et al. |
| 8,320,727 B1 | | 11/2012 | Jacobsen et al. |
| 8,378,877 B2 | | 2/2013 | Tishin et al. |
| 8,518,537 B2 | | 8/2013 | Matitsine |
| 8,558,311 B2 | | 10/2013 | Dubrow et al. |
| 8,765,230 B1 | | 7/2014 | Waldrop et al. |
| 9,630,381 B2 | | 4/2017 | Millett |
| 9,728,860 B2 | | 8/2017 | Matitsine et al. |
| 9,819,094 B2 | | 11/2017 | Matitsine et al. |
| 2001/0020752 A1 | | 9/2001 | Schryvers et al. |
| 2001/0022560 A1 | | 9/2001 | Hirtzlin et al. |
| 2001/0029119 A1 | | 10/2001 | Chung |
| 2002/0001701 A1 | | 1/2002 | Matsunaga |
| 2002/0003505 A1 | | 1/2002 | Ebling et al. |
| 2002/0094426 A1 | | 7/2002 | Stepanian et al. |
| 2003/0002045 A1 | | 1/2003 | Nemat-Nasser et al. |
| 2003/0027910 A1 | | 2/2003 | Misra et al. |
| 2003/0153635 A1 | | 8/2003 | Spitler et al. |
| 2003/0158294 A1 | | 8/2003 | Chaudhuri et al. |
| 2004/0029985 A1 | | 2/2004 | Aki et al. |
| 2004/0051666 A1 | | 3/2004 | Aisenbrey |
| 2004/0104847 A1 | | 6/2004 | Killen et al. |
| 2004/0174318 A1 | | 9/2004 | Aisenbrey |
| 2004/0174651 A1 | | 9/2004 | Aisenbrey |
| 2005/0022905 A1 | | 2/2005 | Wong et al. |
| 2005/0025956 A1 | | 2/2005 | Bainbridge |
| 2005/0100728 A1 | | 5/2005 | Ristic-Lehmann et al. |
| 2005/0287352 A1 | | 12/2005 | Myers et al. |
| 2006/0003152 A1 | | 1/2006 | Youngs |
| 2006/0028386 A1 | | 2/2006 | Ebling et al. |
| 2006/0083948 A1 | | 4/2006 | Kawaguchi et al. |
| 2006/0269738 A1 | | 11/2006 | Kimberly |
| 2007/0066198 A1 | | 3/2007 | Rambosek et al. |
| 2007/0216596 A1 | | 9/2007 | Lewis et al. |
| 2008/0048921 A1 | | 2/2008 | Rebeiz et al. |
| 2008/0058467 A1 | | 3/2008 | Takagi et al. |
| 2008/0108717 A1 | | 5/2008 | Tokoro et al. |
| 2008/0187739 A1 | | 8/2008 | Baker et al. |
| 2008/0224937 A1 | | 9/2008 | Kimura et al. |
| 2008/0248283 A1 | | 10/2008 | Golner et al. |
| 2008/0278394 A1 | | 11/2008 | Koh et al. |
| 2009/0045195 A1 | | 2/2009 | Djerf et al. |
| 2009/0226696 A1 | | 9/2009 | Simpson |
| 2010/0189884 A1 | | 7/2010 | Kaiser et al. |
| 2010/0231433 A1 | | 9/2010 | Tishin et al. |
| 2010/0236596 A1 | | 9/2010 | Lee et al. |
| 2010/0266862 A1 | | 10/2010 | Lugg et al. |
| 2011/0003131 A1 | | 1/2011 | Matitsine |
| 2011/0059362 A1 | | 3/2011 | West et al. |
| 2011/0155945 A1 | | 6/2011 | Soong |
| 2011/0155946 A1 | | 6/2011 | Simpson |
| 2011/0205119 A1 | | 8/2011 | Timofeev et al. |
| 2011/0217544 A1 | | 9/2011 | Young et al. |
| 2011/0236672 A1 | | 9/2011 | Yanagimoto et al. |
| 2011/0260936 A1 | | 10/2011 | Leung et al. |
| 2012/0245016 A1 | | 9/2012 | Curry et al. |
| 2013/0056244 A1 | | 3/2013 | Srinivas et al. |
| 2013/0088406 A1 | | 4/2013 | Hamada et al. |
| 2013/0118773 A1 | | 5/2013 | Liu |
| 2014/0139370 A1 | | 5/2014 | Hamner et al. |
| 2015/0002352 A1 | | 1/2015 | Merlet et al. |
| 2015/0042526 A1 | | 2/2015 | Zeine |
| 2015/0070230 A1 | | 3/2015 | Bradley et al. |
| 2015/0091767 A1 | | 4/2015 | Matitsine et al. |
| 2015/0325348 A1 | | 11/2015 | Matitsine |
| 2016/0083583 A1 | | 3/2016 | Wilenski |
| 2016/0083871 A1 | | 3/2016 | Meure et al. |
| 2016/0194459 A1 | | 7/2016 | Kozar et al. |
| 2017/0043552 A1 | | 2/2017 | Lenzi |
| 2017/0203552 A1 | | 7/2017 | D'Arcy et al. |
| 2017/0279202 A1 | * | 9/2017 | Galla .................... H01Q 15/10 |
| 2017/0324171 A1 | | 11/2017 | Shehan |
| 2018/0166789 A1 | | 6/2018 | Galla et al. |

FOREIGN PATENT DOCUMENTS

| | | | |
|---|---|---|---|
| GB | | 665747 | 1/1952 |
| GB | | 1125828 | 9/1968 |
| JP | | 53-026996 | 3/1978 |
| JP | | 2000-272020 | * 10/2000 |
| JP | | 2001-316514 | * 11/2001 |
| JP | | 2001-316514 A | 11/2001 |
| WO | WO 2002/102584 A1 | | 12/2002 |
| WO | WO 2005/002841 A1 | | 1/2005 |
| WO | | 2007/083921 A1 | 7/2007 |
| WO | | 2017027569 A1 | 2/2017 |

\* cited by examiner

METHODS OF PREPARING A COMPOSITE DIELECTRIC MATERIAL

CROSS-REFERENCE TO RELATED APPLICATIONS

The present application is a 35 U.S.C. § 371 national stage application of PCT Application No. PCT/US2018/044002, filed on Jul. 27, 2018, which itself claims priority to U.S. Provisional Patent Application Ser. No. 62/559,014, filed on Sep. 15, 2017, the entire contents of both of which are incorporated herein by reference as if set forth in their entireties. The above-referenced PCT Application was published in the English language as International Publication No. WO 2019/055134 A1 on Mar. 21, 2019.

BACKGROUND

The present invention generally relates to radio communications and, more particularly, to methods of making materials for lensed antennas used in cellular and other communications systems.

Cellular communications systems are well known in the art. In a cellular communications system, a geographic area is divided into a series of regions that are referred to as "cells," and each cell is served by a base station. The base station may include one or more antennas that are configured to provide two-way radio frequency ("RF") communications with mobile subscribers that are geographically positioned within the cells served by the base station. In many cases, each base station provides service to multiple "sectors," and each of a plurality of antennas will provide coverage for a respective one of the sectors. Typically, the sector antennas are mounted on a tower or other raised structure, with the radiation beam(s) that are generated by each antenna directed outwardly to serve the respective sector.

A common wireless communications network plan involves a base station serving three hexagonally shaped cells using three base station antennas. This is often referred to as a three-sector configuration. In a three-sector configuration, each base station antenna serves a 120° sector. Typically, a 65° azimuth Half Power Beamwidth (HPBW) antenna provides coverage for a 120° sector. Three of these 120° sectors provide 360° coverage. Other sectorization schemes may also be employed. For example, six, nine, and twelve sector configurations are also used. Six sector sites may involve six directional base station antennas, each having a 33° azimuth HPBW antenna serving a 60° sector. In other proposed solutions, a single, multi-column array may be driven by a feed network to produce two or more beams from a single phased array antenna. For example, if multi-column array antennas are used that each generate two beams, then only three antennas may be required for a six-sector configuration. Antennas that generate multiple beams are disclosed, for example, in U.S. Patent Publication No. 2011/0205119, which is incorporated herein by reference.

Increasing the number of sectors increases system capacity because each antenna can service a smaller area and therefore provide higher antenna gain throughout the sector and because frequency bands may be reused for each sector. However, dividing a coverage area into smaller sectors has drawbacks because antennas covering narrow sectors generally have more radiating elements that are spaced wider apart than are the radiating elements of antennas covering wider sectors. For example, a typical 33° azimuth HPBW antenna is generally twice as wide as a typical 65° azimuth HPBW antenna. Thus, cost, space and tower loading requirements increase as a cell is divided into a greater number of sectors.

Lenses may be used in cellular and other communications systems to focus an antenna beam, which can be useful for increasing the number of sectors served by a cellular base station, and which may be useful in other communications systems for focusing the antenna beam on an area of interest. Lenses, however, may increase the cost, weight and/or complexity of the antenna. Lightweight antenna lens materials are therefore desirable.

There is a need for improvements in the manufacturing of such lightweight lens materials. For example, one area that can be improved is manufacturing efficiency. Another example of an area to improve is to reduce degradation of the material as a result of the manufacturing process itself and/or as a result of settling, shifting, or other changes in volume of the material over time, which can undesirably alter the lens's function and refraction properties. Other areas exist for improvements in the manufacturing of the lenses and/or lens materials.

SUMMARY

In general terms, the present disclosure is directed to methods of manufacturing composite dielectric materials for RF antenna lenses, such as lenses used in base station antennas of cellular communications systems.

However, materials described herein need not be limited to antenna lens applications. Materials provided by means of the disclosed preparation methods are strong and extremely lightweight. Once prepared, at least some of the materials described herein can be shaped into any number of desired objects and incorporated into any of a large number of products, such as protective gear (e.g., helmets), packing material, thermal insulation, containers, etc.

Antenna lenses in which the composite dielectric materials of the present disclosure are used can be any suitable shape, including but not limited to cylindrical or spherical or ellipsoidal. Typically, the lens comprises a container that holds the composite dielectric material. The container, therefore, can have an outer shell that is substantially cylindrical or spherical or ellipsoidal and that defines an interior cavity or volume in which the composite dielectric material is contained.

According to certain aspects of the present disclosure, methods of preparing a composite dielectric material include: providing a lens container having a predefined volume; adding to the lens container a predefined mass of an unexpanded mixture comprising expandable microspheres and expanded microspheres, the expandable microspheres and the expanded microspheres comprising a dielectric material; optionally closing off the predefined volume to prevent the microspheres from escaping the predefined volume; and heating the unexpanded mixture within the lens container to form an expanded mixture having a volume at least substantially equal to the predefined volume and/or a mass at least substantially equal to the predefined mass.

In some examples, the unexpanded mixture includes one or more of a binding material, such as oil, and/or a dielectric structuring material, such as foamed polystyrene and/or expanded polypropylene.

Although "expandable microspheres" and "expanded microspheres" will be referenced throughout this disclosure, it should be appreciated that they need not be spherical. Any expandable shape of material, i.e., any shape of "expandable microparticle" can be used for this purpose. Thus, an expandable microparticle can be, e.g., spherical, cubic, cuboid, ellipsoid, irregular, pyramidal, conical, etc.

The expansion described in accordance with the microparticles of the present disclosure is thermal expansion. That is, the expandable microparticles described herein are expandable at least by application of heat.

According to further aspects of the present disclosure, methods of preparing a composite dielectric material include: combining expandable microspheres and conductive elements interspersed between the expandable microspheres to form an unexpanded mixture, the expandable microspheres comprising a dielectric material; and induction heating the unexpanded mixture to expand the expandable microspheres.

In some examples, the unexpanded mixture includes one or more of a binding material, such as oil, and/or a dielectric structuring material, foamed polystyrene and/or expanded polypropylene.

According to further aspects of the present disclosure, methods of preparing a composite dielectric material comprise: combining expandable microspheres and expanded microspheres to form an unexpanded mixture, the expandable microspheres and the expanded microspheres comprising a dielectric material; and heating the unexpanded mixture to expand the expandable microspheres.

In some examples, the unexpanded mixture includes one or more of a binding material, such as oil, and/or a dielectric structuring material such as foamed polystyrene, and/or expanded polypropylene.

According to further aspects of the present disclosure, methods of preparing a composite dielectric material comprise combining expandable microspheres and expanded microspheres to form an unexpanded mixture, the expandable microspheres and the expanded microspheres comprising a dielectric material; and heating the unexpanded mixture to expand the expandable microspheres and form an integral block of the composite dielectric material, wherein the heating produces a total volume of the composite dielectric material that is equal to a volume of the integral block.

In some examples, the unexpanded mixture includes one or more of a binding material, such as oil, and/or a dielectric structuring material such as foamed polystyrene and/or expanded polypropylene.

In some examples, the integral block is formed within a lens container having a predefined volume.

In some examples, the heating is induction heating generated by an induction coil surrounding at least a portion of a lens container containing the unexpanded mixture, and the unexpanded mixture includes conductive elements that heat up from the induction heating.

In some examples, the pre-heated mixture is placed in a container of fixed volume for heating, and the pre-heated mixture and the post-heated mixture have substantially the same volume, the pre-heated mixture having been prevented or at least somewhat constrained from increasing in volume during the heating process. Constraining expansion of the material increases the pressure in the container as a result of the heating. In some examples, the increased pressure within the container can cause fusion of the material in the container and cause the material to form an integral block of composite dielectric material.

According to the various aspects of the present disclosure, in those examples in which the composite dielectric material includes conductive elements, in some examples the conductive elements may be larger in at least one dimension than the expandable and/or the expanded microspheres. In some examples, the particles of conductive material may comprise glitter and/or flitter. In some examples, the conductive particles may each comprise a thin metal sheet having a thickness at least ten times smaller than a sum of a length and width of the thin metal sheet, the thin metal sheet having an insulating material on either major face thereof. In some examples, conductive particles are added to the mixture as it heats. In some examples, the mixture is stirred or otherwise agitated as it heats.

According to the various aspects of the present disclosure, in some examples the expandable microspheres can be gas-filled or liquid filled, and/or the expanded microspheres have essentially hollow centers when expanded.

The methods of the present disclosure can help to alleviate or reduce inefficiencies and/or inconsistencies in the manufacturing of lightweight RF antenna lens materials. For example, conventional heating techniques to expand expandable microspheres can degrade the material. In conventional heating techniques, the material is heated from the outside inwards. Imparting sufficient heat to expand the more internally disposed microspheres can requires as much as 15-30 minutes or more to thermally expand all of the expandable material; in the process, the material can overheat and cause degradation of the more externally disposed microspheres, leading to a poorer functioning lenses.

By incorporating conductive elements into the unexpanded material and heating the unexpanded material via induction, expansion can be accomplished more quickly (e.g., in as little as 10 seconds or less) and uniformly across the volume of material, reducing or eliminating underexpansion or overheating of portions of the material. The expandable materials used for the composite dielectric material of the present disclosure have low density and are inherently thermal insulators, and thus heat very slowly by conventional means (e.g., an oven). Introducing conductive elements to the material and heating the material via induction methods can decrease heating time by as much 30 times or more (as compared with conventional heating means, such as an oven) in order to achieve the desired dielectric material. Induction heating also allows for the material to be heated within a fixed volume, and without stirring the material during the heating process, thereby reducing the risk of explosion. Furthermore, induction heating facilitates the heating of large volumes of material at the same time.

By way of another example, both expandable and expanded microspheres can have extremely low density such that tiny disturbances, movements, or transferring of the material from one container to another can cause settling (i.e., compacting), shifting, or other changes in the volume of the material, resulting in detrimental variations in the refractive properties of the material. Expanded and expandable microspheres can be so light weight that they resemble dust in their vulnerability to simply blow away, impacting the consistency and stability of the manufacturing process. Moreover, non-uniform compacting of the lens material can result in insufficient anisotropy of the material for purposes of sectorized microwave refraction by an RF antenna. Performing the expansion with a known mass of the unexpanded material confined within a known volume, i.e., the lens container, can reduce such variations. Likewise, expanding the expandable material into a solid integral block rather than loose beads can improve the volumetric stability of the lens material.

A variety of additional aspects will be set forth in the description that follows. The aspects relate to individual features and to combinations of features. It is to be understood that both the foregoing general description and the following detailed description are exemplary and explana-

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1A:
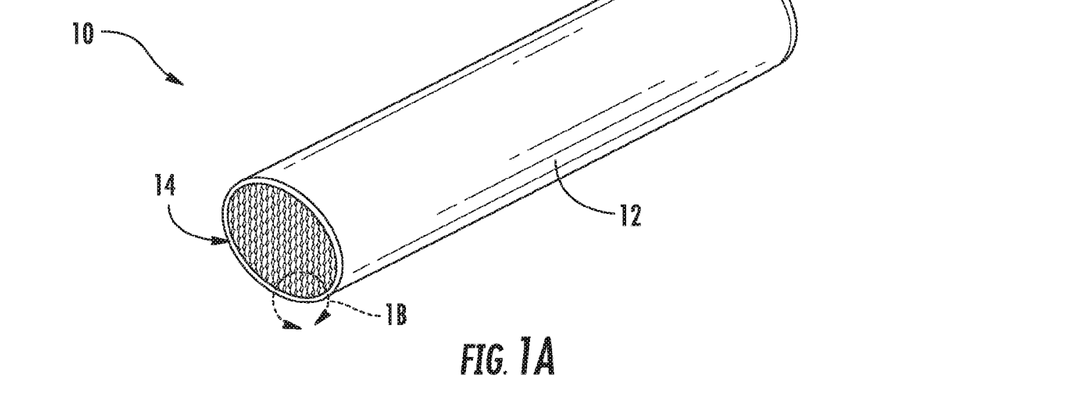
FIG. 1A is a schematic perspective of an example of an RF lens for an antenna, the RF lens including a composite dielectric material prepared according to one or more methods of the present disclosure.
Figure 1B:
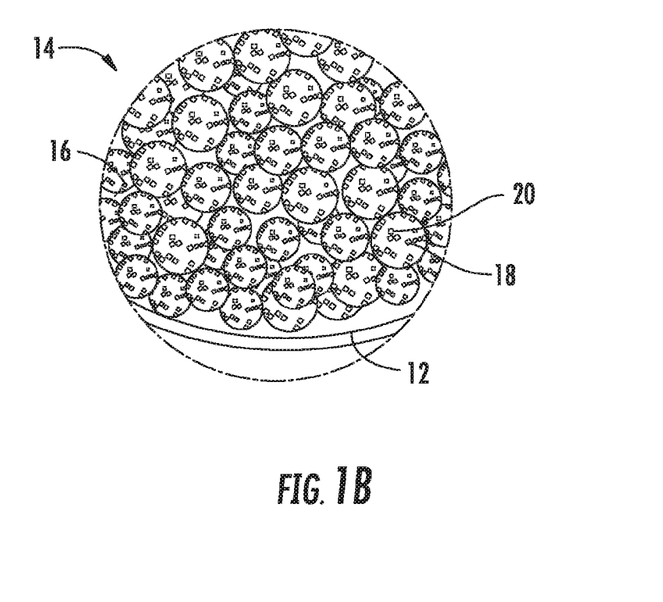
FIG. 1B is an enlarged view of the callout portion of FIG. 1A that illustrates the structure of the composite dielectric material.

Referring to FIGS. 1A and 1B, an example RF antenna lens 10 includes a substantially cylindrical container 12. In some examples, the container 12 is made from a dielectric material. The container 12 has a predefined volume filled with an expanded composite dielectric material 14 made in accordance with one or more of the methods of the present disclosure. The composite dielectric material 14 is made up of expanded microspheres 18 interspersed with conductive elements 20, such as glitter or flitter.

Subunits 16 of the composite dielectric material 14 include an expanded microsphere 18 and one or more pieces of the conductive elements 20 that can cling, at least temporarily, to the microsphere 18. The subunits 16 can define a matrix that supports the conductive elements. The subunits 16 can resemble beads that do not adhere to one other, such that the material 14 can flow. Optionally a binding agent, such as an inert oil or adhesive can be included in the material 14 to help stabilize the subunits 16 and reduce their movement relative to one another.

Figure 2:
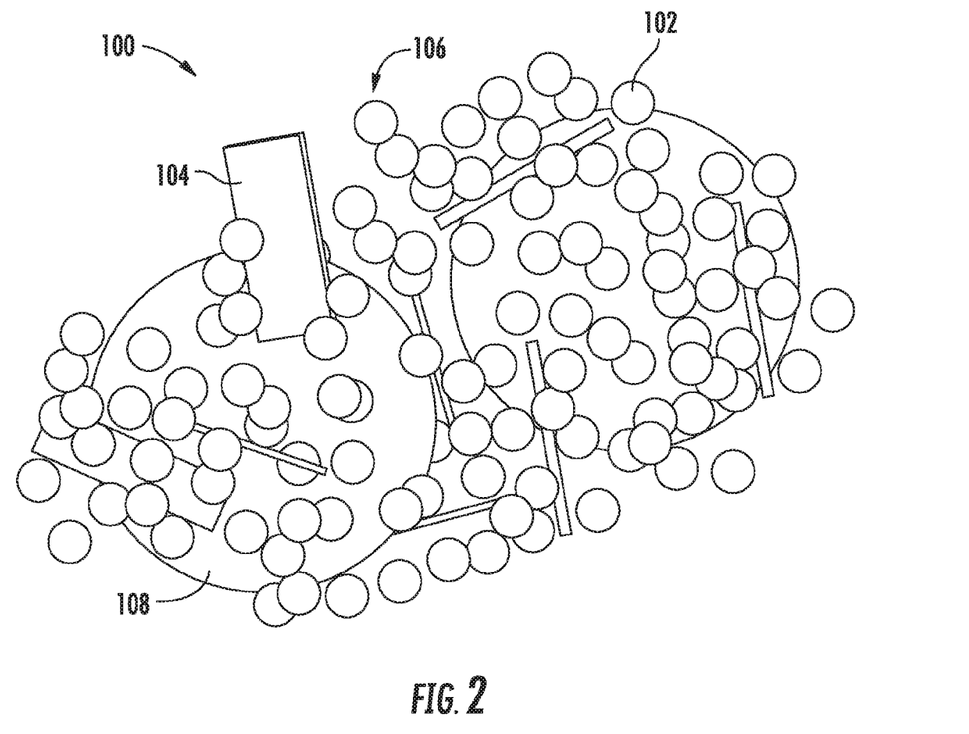
FIG. 2 is a schematic perspective view of a further example of an expanded composite dielectric material prepared according to methods of the present disclosure.

FIG. 2 is a schematic perspective view of a further example of an expanded composite dielectric material 100 prepared according to one or more methods of the present disclosure. The material 100 is loose in that its components are not fused together into an integral solid block. Thus, as with the material 14, in some examples the material 100 can have liquid or pseudo-liquid type properties that allow it to flow.

The material 100 includes expanded microspheres 102, conductive elements 104 (e.g., conductive sheet material such as glitter or flitter) that have an insulating material on each major surface, dielectric structuring materials 108 such as foamed polystyrene microspheres or other shaped foamed particles, and a binder 106 such as, for example, an inert oil.

The expanded microspheres 102 may comprise very small (e.g., 1-10 microns in diameter) spheres that expand in response to a catalyst (e.g., heat) to larger (e.g., 12-100 micron in diameter) air-filled spheres. The expanded microspheres 102 may have very small wall thickness and hence may be very lightweight. The pre-expanded (i.e., "expandable") microspheres may comprise, for example, a low density, dielectric, heat sensitive material such as acrylonitrile butadiene styrene.

The conductive elements 104 may comprise, for example, a thin sheet of metal (e.g., 1-25 microns thick) that has a thin insulative coating (e.g., 0.5-25 microns) on one or both sides thereof that is cut into small pieces (e.g., small 200-800 micron squares or other shapes having a similar major surface area). In some examples, the conductive elements 104 may comprise a 1-10 micron thick metal layer (e.g., aluminium or copper), that is deposited on top of a sheet of base insulative material (e.g., a sheet of polyethylene terephthalate) having a thickness of 5-20 microns. A thinner insulative layer may be deposited on top of the metal layer, such as a 1-2 micron thick polyethylene or epoxy coating. Large sheets of the flitter material may be formed, and these sheets may then be cut into small square or other shaped flakes. In one example, the flitter flakes may be 375×375 micron flakes that have a thickness of, for example, less than 25 microns. Other sized flitter flakes may be used (e.g., sides of the flake may be in the range from 100 microns to 1500 microns, and the flitter flakes need not be square).

The dielectric structuring material 108 may comprise, for example, equiaxed particles of foamed polystyrene or other lightweight dielectric materials such as expanded polypropylene. A wide variety of low-loss, lightweight polymeric materials may be used. An "equiaxed" particle refers to a particle that has axes that are roughly on the same order. Spheres, square cubes, hexagonal cubes and the like are all equiaxed particles, as are particles that are nearly those shapes (e.g., within 25%) or particles that are generally square cubes, spheres or the like that have non-smooth surfaces.

In some examples, the dielectric structuring material 108 may be larger than the expanded microspheres 102 (e.g., having diameters of between 0.5 and 3 mm). The dielectric structuring material 108 may be used to control the distribution of the conductive elements 104 so that the conductive elements have, for example, a suitably random orientation for refraction purposes. The dielectric structuring material 108 can also help to minimize physical contact between the conductive elements, which can negatively impact the composite dielectric material's refractive properties.

As noted, the addition of the dielectric structuring material 108 can help to randomize the orientation of the conductive elements 104. The dielectric structuring material 108 may tend to organize in the composite material so that the conductive elements 104 fall into the natural openings between the dielectric structuring material 108. For example, when foamed spheres are used as the dielectric structuring material 108, the conductive elements 104 may tend to arrange themselves in the natural openings between stacked groups of the foamed spheres. This tends to orient the conductive elements in particular directions in each grouping of foamed spheres. Moreover, the groupings of foamed spheres may tend to have different orientations such that the groupings of foamed spheres may be randomly distributed throughout the composite dielectric material 100. The net result is that this arrangement tends to randomize the orientation of the conductive elements 104.

In some examples, the dielectric structuring material 108 may comprise at least 40%, by volume of the composite dielectric material 100. In some examples, the dielectric structuring material 108 may comprise more than 50%, by volume, of the composite dielectric material 100. These ratios can apply to any of the composite dielectric materials described herein that include dielectric structuring material.

In some examples, the combination of the inflated/expanded microspheres and the binding agent may comprise between 20-40%, by volume, of the composite dielectric material 100. These ratios can apply to any of the composite dielectric materials described herein that include a binding agent and microspheres.

Figure 3:
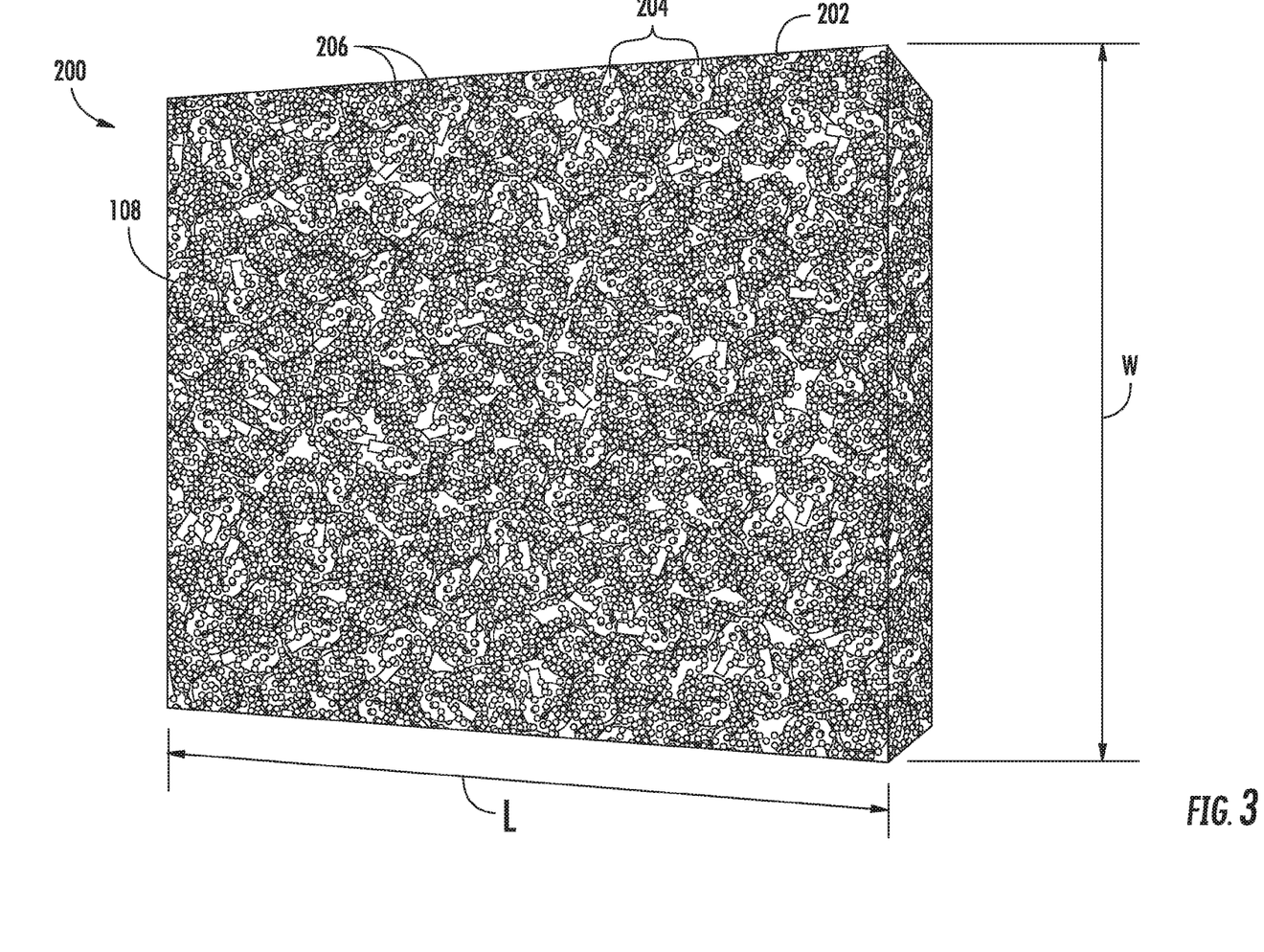
FIG. 3 is a perspective view of an integral block of expanded composite dielectric material manufactured according to methods of the present disclosure.
Figure 4:
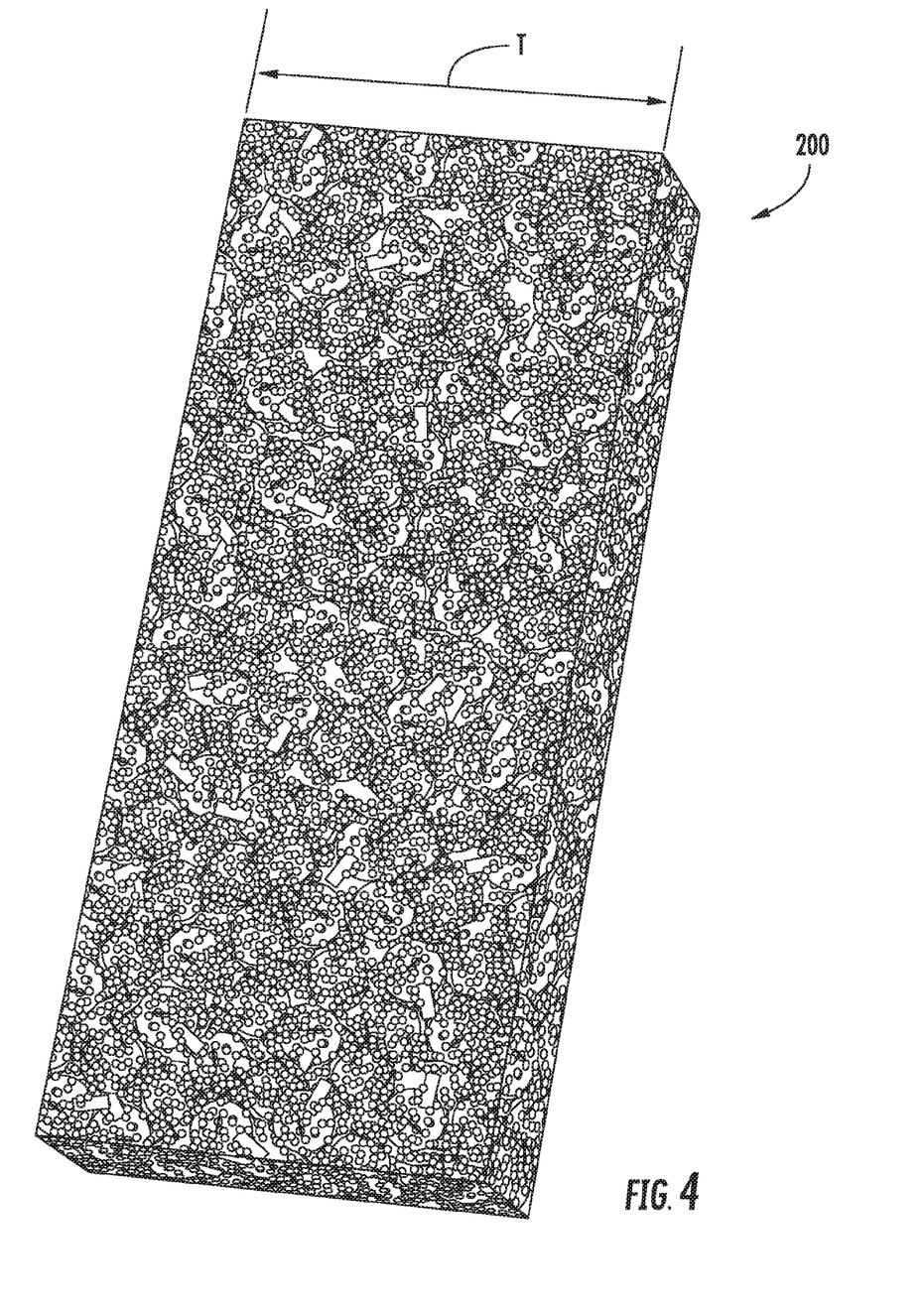
FIG. 4 is a further perspective view of the integral block of expanded composite dielectric material of FIG. 3.

Referring to FIGS. 3 and 4, an integral block 202 of a composite dielectric material 200 formed in accordance with one or more methods of the present disclosure is shown. The integral block 202 has defined dimensions, such as a length L, a width w, and a thickness T. The integral block can take on any desired shape, such as cylindrical, spherical, etc. In some examples, the integral block is formed within, and takes on the shape and volume of, a lens container, such as the lens container 12 of FIG. 1A. It should also be appreciated that an integral block can be manufactured and then cut or otherwise shaped to a desired shape and size for incorporation into a lens.

The composite dielectric material 200 includes expanded microspheres 204 interspersed with conductive elements 206, such as glitter and/or flitter. Subunits containing a microsphere and conductive elements are fused together to form a solid three-dimensional shape. In some examples, the material 200 also includes a dielectric structuring material as well, such as the dielectric structuring material 108. In some examples, the material 200 also includes a binding agent, such as an inert oil. In some examples, the expanded microspheres 204 include some pre-expanded microspheres, i.e., microspheres that were expanded prior to the expansion that yielded the material 200.

The block 202 block may be formed, cut or shaped into a desired shape for an RF antenna lens, or may be cut into smaller blocks that are then used to form the lens.

Figure 5:
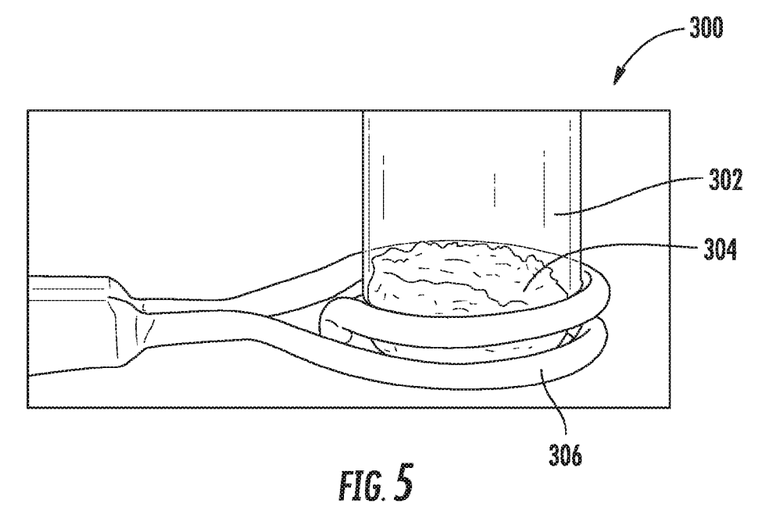
FIG. 5 shows an example apparatus that can be used for expanding an expandable material in accordance with one or more methods of the present disclosure.

Referring now to FIG. 5, an example apparatus 300 that can be used for expanding an expandable material 304 to form a composite dielectric material in accordance with one or more methods of the present disclosure is shown. The material 304 includes at least expandable microspheres and conductive elements. Optionally, the material 304 can include one or more of pre-expanded microspheres, a binding agent, and/or dielectric structuring materials. The ingredients of the material 304 are mixed and held in a container 302. In some examples, the container 302 is an outer shell of a lens, e.g., an RF antenna lens having a predefined volume. An induction coil 306 is wrapped around a portion of the container 302. Alternating electric current generated by a power source can be directed through the induction coil 306 to heat up the conductive elements in the material 304, causing expansion of the expandable microspheres, and thereby expansion of the material 304 within the container 302. The alternating electric current can adopt resonant frequencies dependent on physical characteristics of the system, such as the size and number of induction coils, the composition and quantity of the material to be expanded, etc. In some non-limiting examples, the induction coil can operate at one or more frequencies in a range from 200 kHz to 2 Mhz.

As the microspheres expand, they will tend to push adjacent particles of conductive elements away from each other, thereby reducing or eliminating metal-to-metal connections between conductive elements. To the extent the conductive elements comprises insulation layers (such as in the case of glitter or flitter), this can further reduce the possibility of metal-to-metal contacts that may give rise to distortion in the refractive properties of the composite dielectric material.

Different possible characteristics of the various ingredients of the composite dielectric materials prepared by the methods of the present disclosure will now be discussed.

In some examples, the conductive elements are glitter. Each particle of glitter includes a thin sheet of metal encapsulated on its major sides by an insulative plastic substrate. In an example embodiment, the plastic substrate may have a thickness of between 0.5 and 50 microns, and the thin coating of insulative material may have a thickness of between 0.5 and 15 microns. The thin sheet of metal may comprise, for example, a sheet of aluminum having a thickness between 1 and 50 nanometers. In typical commercially available glitter, the overall thickness of the material may be about 20-30 microns and the aluminum sheet may have a thickness of between 10-100 nanometers. The plastic substrate may comprise any suitable plastic substrate such as polyvinylchloride (PVC), polyethylene terephthalate (PET) or the like. The metal may comprise less than 1% of the glitter by volume.

In some examples, the conductive elements are flitter. Flitter, which is also readily available commercially, and typically comprises a thicker sheet of metal than glitter with an insulative coating (e.g., a polyurethane coating) on one or both major surfaces thereof. In one example, the metal sheet may comprise an aluminum sheet having a thickness of between 6 and 50 microns, and the thin coating(s) of insulative material may have thicknesses of between 0.5 and 15 microns.

Sheets of glitter or flitter may be cut into the small particles of the conductive elements. In some examples the particles may be relatively square in shape with lengths and/or widths on the order of 50 to 1500 microns. In such embodiments, the particles may be sheet-like in nature as they may have a thickness (e.g., 25 microns) that is substantially smaller than their length and width. It will be appreciated, however, that other shapes (e.g., hexagons), lengths and widths may be used in other examples. Materials other than glitter and flitter that heat up when exposed to varying current an induction coil may also be used.

The density of the composite dielectric material prepared according to the processes disclosed herein can be, for example, between 0.005 to 0.2 g/cm3.

The amount of conductive material incorporated into a given amount of composite dielectric material may be selected so that the composite dielectric material has a dielectric constant within a desired range. In some examples, the dielectric constant of the composite dielectric material may be in the range of, for example, 1 to 3.

The expandable microspheres may comprise small spheres (e.g., 1 micron in diameter) that are formed of a dielectric material such as acrylonitrile butadiene styrene.

These small spheres may be expanded by application of heat. When expanded, the expanded microspheres are formed and may have a diameter of, for example, 15-75 microns and a very thin wall thickness of perhaps 0.25 microns. The interior of the expandable microspheres may largely comprise air or a blowing agent such as pentane or isobutene.

The particles of conductive elements may be larger or smaller than the expandable and/or the expanded microspheres. In some particular examples, the conductive elements may comprise particles of glitter or flitter that have lengths and widths of between 50 and 1500 microns and thicknesses of perhaps 25 microns (where the thickness of the metal sheet in the glitter/flitter is less than 25 microns). In some embodiments, the thickness of the metal sheet may be at least ten times smaller than the sum of the length and the width of the metal sheet. For example, the metal sheet in each flitter flake may be 200 microns×200 microns by 15 microns. In this example, the 15 micron thickness is more than ten times smaller than the sum of the width and the length (200 microns+200 microns=400 microns).

In some examples, copper can be used to form the flitter flakes. When copper flitter flakes are heated (e.g., by induction heating), exposed edges of the copper can oxidize into a non-conductive material which may reduce or prevent any flitter flakes that come into contact with each other from becoming electrically connected to each other.

In some examples, the microspheres may be smaller than the conductive element particles in at least two dimensions. For example, a length and width of a conductive element particle may exceed the diameter of the microspheres.

The opposed major surfaces of the conductive elements may have any shape (e.g., square, circular, rectangular, hexagonal, arbitrary, etc.).

The particles of equiaxed dielectric structuring material may all be the same size or may have different sizes. In some embodiments, an average volume of the equiaxed dielectric structuring material particles, which may be computed by adding the volumes of each individual equiaxed dielectric structuring particle in a representative sample of the composite dielectric material and then dividing by the number of particles used in the averaging process, may be at least twenty times greater than an average volume of the conductive elements (which is computed in the same manner). In other embodiments, an average volume of the equiaxed dielectric structuring particles may be at least ten times greater than an average volume of the particles of conductive material. As noted above, performance of composite dielectric materials may be improved in some embodiments when the conductive material has a random orientation within the material.

Figure 6:
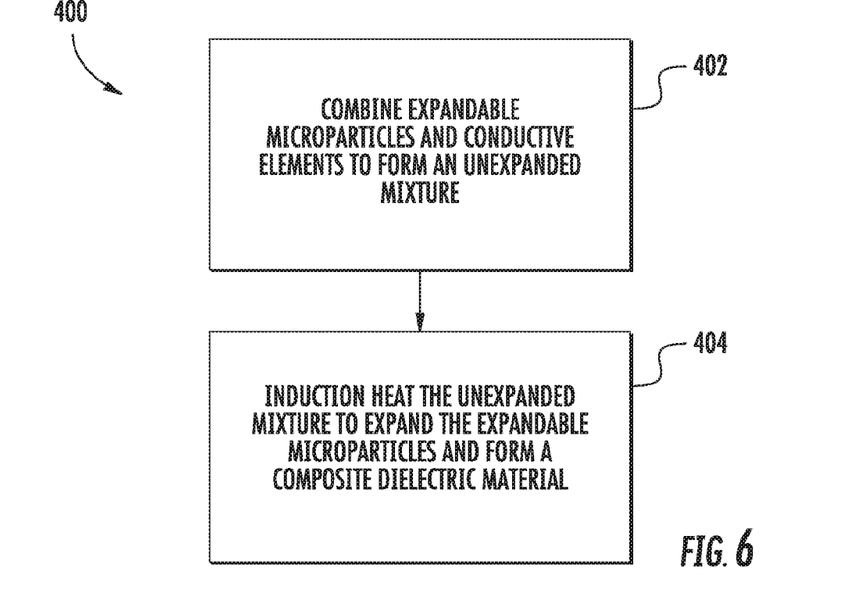
FIG. 6 is a flow chart of an example method of preparing a composite dielectric material in accordance with the present disclosure.

Referring now to FIG. 6, in an example method 400 of preparing a composite dielectric lens material in accordance with the present disclosure, in a step 402, expandable microparticles (e.g., microspheres) and conductive elements (e.g., glitter and/or flitter) are combined to form an unexpanded mixture, the expandable microparticles comprising a dielectric material; and in a step 404, the unexpanded mixture is induction heated (e.g., using an induction current passing through one or more induction coils) to heat the conductive elements and thereby expand the expandable microparticles to form the composite dielectric material.

In some examples, the unexpanded mixture includes a binding agent. In some examples, the unexpanded mixture includes a dielectric structuring material, such as foamed polystyrene or expanded polypropylene.

Figure 7:
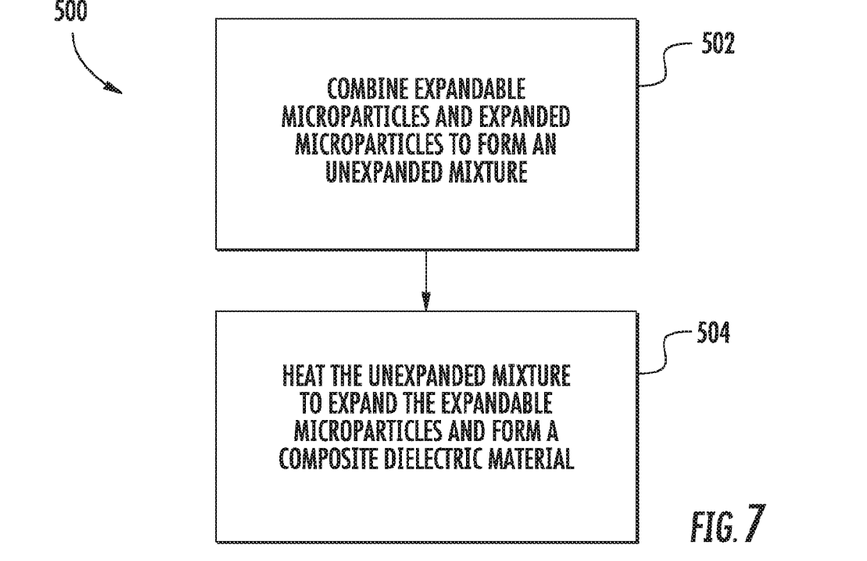
FIG. 7 is a flow chart of a further example method of preparing a composite dielectric material in accordance with the present disclosure.

Referring now to FIG. 7, in a further example method 500 of preparing a composite dielectric lens material in accordance the present disclosure, in a step 502 expandable microparticles (e.g., expandable microspheres) and expanded microparticles (e.g., expanded microspheres) are combined to form an unexpanded mixture, the expandable microparticles and the expanded microparticles comprising a dielectric material; and in a step 504 the unexpanded mixture is heated to expand the expandable microparticles and thereby form the composite dielectric material.

In some examples, the unexpanded mixture includes conductive elements and the heating is induction heating performed by, e.g., an induction coil. In some examples, the unexpanded mixture includes a binding agent. In some examples, the unexpanded mixture includes a dielectric structuring material, such as foamed polystyrene or expanded polypropylene. In some examples, the expandable microparticles and expanded microparticles of the unexpanded mixture are made of the same material, e.g., spheres of acrylonitrile butadiene styrene.

Figure 8:
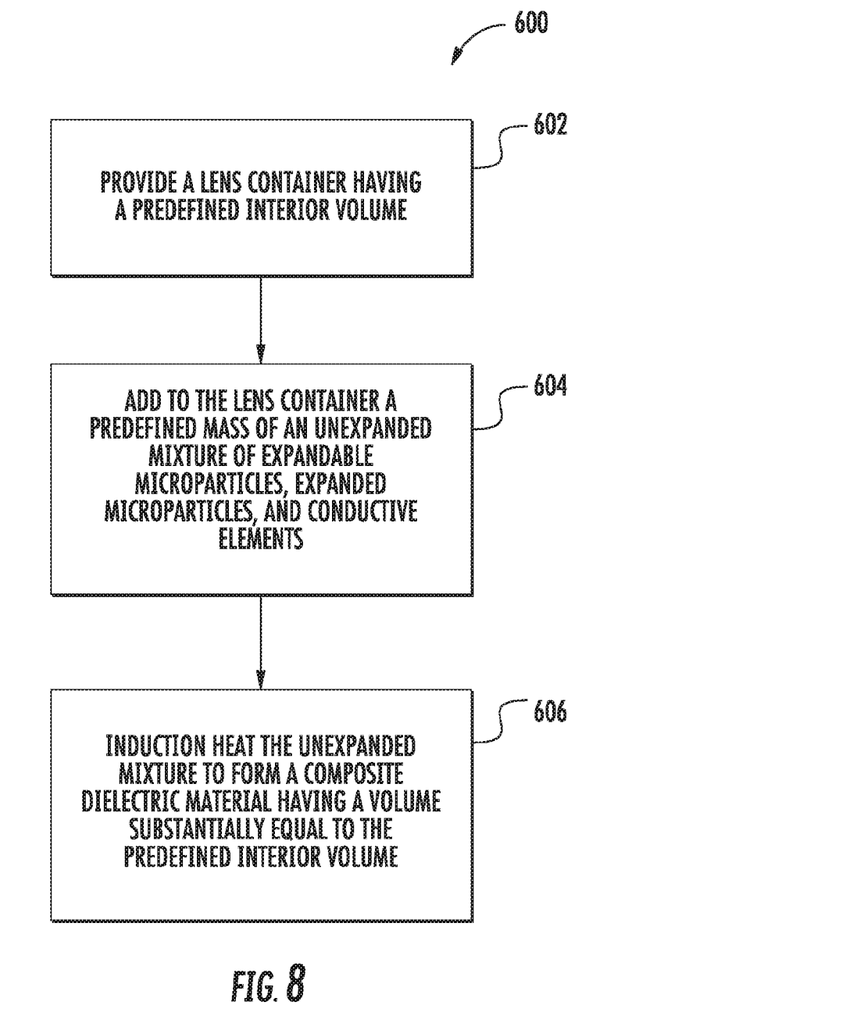
FIG. 8 is a flow chart of a further example method of preparing a composite dielectric material in accordance with the present disclosure.

Referring now to FIG. 8, in a further example method 600 of preparing a composite dielectric lens material in accordance with the present disclosure, in a step 602 a lens container having a predefined interior volume is provided; in a step 604 a predefined mass of an unexpanded mixture comprising expandable microparticles (e.g., microspheres), expanded microparticles (e.g., microspheres) and conductive elements (e.g., glitter and/or flitter) is added to the lens container, the expandable microparticles and the expanded microparticles comprising a dielectric material and the unexpanded mixture having a volume less than the interior volume of the lens container; and in a step 606 the unexpanded mixture is induction heated (e.g., with one or more induction coils) within the lens container to expand the expandable microparticles and form a composite dielectric material having a volume substantially equal to the predefined interior volume of the lens container.

In some examples, the mass of the expanded material contained within the lens container is at least substantially the same as the mass of the unexpanded material. In some examples, the lens container is closed off prior to expansion to prevent any dielectric material from escaping the lens container. In some examples, the unexpanded mixture includes a dielectric structuring material, such as foamed polystyrene or expanded polypropylene. In some examples, the expandable microparticles and expanded microparticles of the unexpanded mixture are made of the same material, e.g., spheres of acrylonitrile butadiene styrene.

According to still further example methods of a preparing a dielectric material in accordance with the present disclosure, a container is filled with a mixture of glitter and/or flitter, expandable microspheres, and expanded microspheres, wherein with respect to the combined volume of expanded and unexpanded microspheres, anywhere from 5% to 40% (by volume) is the unexpanded microspheres. In some examples the unexpanded microspheres occupy approximately 25% by volume of the expanded and unexpanded microspheres. The volume of the mixture is fixed or substantially constrained from growth/expansion within the container, e.g., by filling the container with the mixture and covering the container. The mixture is then heated (e.g., via induction), causing the expandable microspheres to expand and thereby increase the pressure in the container due to the container's fixed volume and/or the constraint of volume growth of the material. The increased pressure can cause the microspheres to fuse together to form an integral block of composite dielectric material having a fixed volume that can be used in, e.g., an RF antenna lens.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A method of preparing a composite dielectric material, comprising:
   combining expandable microparticles and conductive elements and a dielectric structuring material to form an unexpanded mixture, the expandable microparticles comprising a dielectric material; and
   induction heating the unexpanded mixture to expand the expandable microparticles,
   wherein the dielectric structuring material comprises a foamed polystyrene or expanded polypropylene in a particle size or sizes that is or are greater than the expandable microparticles before and after the induction heating, and wherein the composite dielectric material has a density in a range of 0.005 to 0.2 g/cm$^3$.

2. The method of claim 1, wherein the induction heating is performed by an induction coil.

3. The method of claim 1, wherein the combining further comprises adding a binding agent to form the unexpanded mixture.

4. The method of claim 1, wherein the conductive elements include glitter and/or flitter.

5. The method of claim 1, wherein the induction heating forms a matrix of expanded microparticles from the expandable microparticles that supports the conductive elements.

6. A method of preparing a lens comprising a composite dielectric material, the method comprising:
   combining expandable microparticles and conductive elements in a lens container to form an unexpanded mixture, the expandable microparticles comprising a dielectric material; and
   induction heating the unexpanded mixture to heat the conductive elements inside the lens container in order to heat and expand the expandable microparticles in the lens container to form the lens,
   wherein the induction heating forms a matrix of expanded microparticles that supports the conductive elements,
   wherein the conductive elements comprise metal sheets having a thickness at least ten times smaller than a sum of a length and width of the metal sheets, and wherein the conductive elements of the matrix are substantially insulated from one another.

7. The method of claim 3, wherein the expanded microparticles and the binding agent together comprise at least 20% by volume of the composite dielectric material.

8. The method of claim 1, further comprising forming an RF antenna lens containing the composite dielectric material.

9. A method of preparing a composite dielectric material, comprising:
   combining expandable microparticles and expanded microparticles to form an unexpanded mixture, the expandable microparticles and the expanded microparticles comprising a dielectric material; and
   heating the unexpanded mixture to expand the expandable microparticles to increase outer diameters of at least some of the expandable microparticles to be 15-75 times greater than outer diameters thereof prior to the heating step,
   wherein the expanded microparticles provided in the unexpanded mixture have diameters that are greater than outer diameters of the expandable microparticles after the heating,
   wherein the combining further comprises combining conductive elements that are interspersed between the expandable microparticles in an elongate cylindrical RF antenna lens container, and wherein the conductive elements comprise metal sheets having a thickness at least ten times smaller than a sum of a length and width of the metal sheets.

10. The method of claim 9, wherein the conductive elements comprise glitter or flitter, and wherein the dielectric material comprises acrylonitrile butadiene styrene.

11. A method of preparing a lens comprising:
    providing a container having a predefined volume;
    adding to the container a predefined mass of an unexpanded mixture comprising expandable microparticles, expanded microparticles and conductive elements, the expandable microparticles and the expanded microparticles comprising a dielectric material, the unexpanded mixture having a volume less than the predefined volume of the lens container; and
    induction heating the unexpanded mixture within the container to form an expanded mixture having a volume that is at least substantially equal to the predefined volume of the container,
    wherein the induction heating increases outer diameters of at least some of the expandable microparticles to be 15-75 times greater than outer diameters thereof prior to the induction heating step.

12. A method of preparing a lens comprising:
    providing a container having a predefined volume;
    adding to the container a predefined mass of an unexpanded mixture comprising expandable microparticles, expanded microparticles and conductive elements, the expandable microparticles and the expanded microparticles comprising a dielectric material, the unexpanded mixture having a volume less than the predefined volume of the lens container; and
    induction heating the unexpanded mixture within the container to form an expanded mixture having a volume that is at least substantially equal to the predefined volume of the container,
    wherein the method further comprises closing off the container prior to the induction heating to contain the unexpanded mixture and the expanded mixture within the container, wherein the induction heating increases outer diameters of at least some of the expandable microparticles to be 15-75 times greater than outer diameters thereof prior to the heating step, and
    wherein the expanded microparticles provided in the unexpanded mixture have diameters that are greater than outer diameters of the expandable microparticles after the induction heating.

13. A method of preparing a lens comprising:
    providing a container having a predefined volume;
    adding to the container a predefined mass of an unexpanded mixture comprising expandable microparticles, expanded microparticles and conductive elements, the expandable microparticles and the expanded microparticles comprising a dielectric material, the unexpanded mixture having a volume less than the predefined volume of the lens container; and induction heating the unexpanded mixture within the container to form an expanded mixture having a volume that is at least substantially equal to the predefined volume of the container, wherein the expanded mixture has a mass that is at least substantially equal to the predefined mass, wherein the expanded microparticles in the unexpanded mixture are in particle sizes that are greater than the expandable microparticles before and after induction heating, and wherein the expanded mixture is a composite dielectric material that has a density in a range of 0.005 to 0.2 $g/cm^3$.

14. A method of preparing a composite dielectric material, comprising:

combining in a container expandable microparticles and expanded microparticles to form a mixture having a volume; and heating the mixture while constraining expansion of the volume to expand the expandable microparticles to increase outer diameters of at least some of the expandable microparticles to be 15-75 times greater than outer diameters thereof prior to the heating step, wherein the expanded microparticles provided in the unexpanded mixture have diameters that are greater than outer diameters of the expandable microparticles after the heating, wherein the constraining prevents expansion of the volume, wherein the combining further comprises combining conductive elements that are interspersed in random orientations between the expandable microparticles in an elongate cylindrical RF antenna lens container, wherein the conductive elements comprise metal sheets having a thickness at least ten times smaller than a sum of a length and width of the metal sheets, and wherein the heating is induction heating.

15. A method of preparing a composite dielectric material, comprising:

combining in a container expandable microparticles and expanded microparticles to form a mixture having a volume; and heating the mixture while constraining expansion of the volume to expand the expandable microparticles to increase outer diameters of at least some of the expandable microparticles to be 15-75 times greater than outer diameters thereof prior to the heating step, wherein the expanded microparticles provided in the unexpanded mixture have diameters that are greater than outer diameters of the expandable microparticles after the heating, wherein the combining further includes adding glitter and/or flitter to form the mixture, wherein the composite dielectric material has a density in a range of 0.005 to 0.2 $g/cm^3$, and wherein the heating is induction heating.

16. The method of claim 14, wherein the heating increases a pressure inside the container.

* * * * *